May 8, 1962 W. A. MARTIN 3,032,858
MANUFACTURE OF MISSILE CASINGS
Filed July 21, 1958 11 Sheets-Sheet 1

Inventor
Wayne A. Martin

May 8, 1962 W. A. MARTIN 3,032,858
MANUFACTURE OF MISSILE CASINGS
Filed July 21, 1958 11 Sheets-Sheet 2

Inventor
Wayne A. Martin

May 8, 1962 W. A. MARTIN 3,032,858
MANUFACTURE OF MISSILE CASINGS
Filed July 21, 1958 11 Sheets-Sheet 4

Inventor
Wayne A. Martin

May 8, 1962 W. A. MARTIN 3,032,858
MANUFACTURE OF MISSILE CASINGS
Filed July 21, 1958 11 Sheets-Sheet 5

Inventor
Wayne A. Martin
by Hill, Sherman, Meroni, Gross & Simpson Attys

May 8, 1962 W. A. MARTIN 3,032,858
MANUFACTURE OF MISSILE CASINGS
Filed July 21, 1958 11 Sheets-Sheet 10

Inventor
Wayne A. Martin
by Hill, Sherman, Meroni, Gross & Simpson Attys

May 8, 1962  W. A. MARTIN  3,032,858
MANUFACTURE OF MISSILE CASINGS
Filed July 21, 1958  11 Sheets-Sheet 11

Inventor
Wayne A. Martin
by Hill, Sherman, Meroni, Gross & Simpson Attys

3,032,858
MANUFACTURE OF MISSILE CASINGS
Wayne A. Martin, Berkley, Mich., assignor to Lyon Incorporated, Detroit, Mich., a corporation of Delaware
Filed July 21, 1958, Ser. No. 750,010
3 Claims. (Cl. 29—1.21)

The present invention relates broadly to the manufacture of missile and related casings, and is more particularly concerned with a novel process of forming weapon component housings featuring the provision thereon of integral fin receiving projections.

Rocket engine chambers and related missile casings have generally been produced by seam welding a split cylindrical shape and attaching thereto the control fins or supporting structure for said fins by welding techniques. This process is necessarily laborious and quality control problems frequently arise during practice of the method. Inconsistencies are often found in the structural integrity of the welds produced, and it is not unknown for the fin or control surface assembly to separate from its juncture with the missile casing under the extreme flight conditions often encountered by the airborne article. Further, the rolled sheet stock from which missile casings have heretofore been produced not infrequently has areas of localized weakness, and these may produce an ultimate failure of the casing structure.

It is therefore an important aim of the present invention to provide a forming method for missile and related casings which entirely avoids each of the objections to and disadvantages of the prior art methods.

Another object of the invention lies in the provision of a method of producing tubular weapon housings wherein a solid blank is successively formed to the desired configuration and simultaneously therewith integral fin receiving portions formed in the casing walls.

Another object of this invention is to provide a forming method particularly suitable in the production of missile casings and wherein the wall thickness of a pre-formed cup shape is successively drawn to form raised ribs providing supporting structure for the missile control fins.

A further object of the present invention is to provide a method of shaping integral projections extending longitudinally along a missile casing, in which a preliminary configuration of raised ribs is first formed and the shape successively drawn to progressively move said ribs circumferentially inwardly toward one another to essentially the final form desired.

According to general features of the invention, there is provided a method of forming a tubular product for subsequent use as the casing of a rocket motor chamber comprising the steps of: indirectly extending a cup-shaped article of substantially constant longitudinal side wall thickness; subjecting said article to a first draw which elongates and thins the side wall; subjecting said article to a second draw similar to said first draw and with similar results; subjecting said article to a third draw wherein a portion of said wall for a distance above its bottom is elongated and thinned leaving the remaining portion of said wall of the thickness formed in said second draw; retracting said article back out of the third draw female die without affecting the thickness of said remaining portion; subjecting said article to a fourth draw wherein said portion of said wall above said bottom goes loosely through the female die being unworked thereby but wherein said remaining portion is formed with a plurality of pairs of longitudinally extending external ridges and is thinned to the thickness of said remaining portion between said ridges; subjecting said article to a fifth draw which is a partial draw similar to said third draw and with similar results; retracting said article back out of the fifth draw female die without affecting the thickness of said remaining portion; subjecting said article to a sixth draw which is a partial draw similar to said fourth draw but differing therefrom in that said article is not sent all of the way through the sixth draw female die but rather is arrested allowing material to thicken and forge between the remainder of the ridged portion which forging forms a raised external collar near the open end of said article; subjecting said article to a preheading operation which flattens said bottom, forms an aperture therethrough, and forms an embossment around said aperture; repeating pairs of subsequent draws similar to said fifth draw and said sixth draw; annealing between said subsequent draws as necessary and thus producing the desired finally drawn form of said article; and subjecting said article to a final heading operation, thus producing the desired final head shape on said article.

Another feature is to provide such a method which includes the further steps of finishing and internally threading the aperture in the bottom of the article, finishing each pair of the ridges and undercutting the facing sides thereof whereby a mating groove is formed between each pair of ridges to accommodate the tongue of a respective rocket fin when the same is ultimately assembled, and transversely notching each pair of the ridges to accommodate a locking projection to lock the fin in place with respect to the grooves.

According to additional features of the invention, there is provided a punch and die assembly for producing external ridges spaced around the periphery of a cup-shaped article comprising: a stationary base plate having a central opening therethrough; a cylindrical power driven punch reciprocal into and back out of said base plate, said punch having a plurality of button-shaped projections arranged at selected positions around the periphery of said punch with the lower edges of said projections occupying a plane that is normal to the punch axis; and a female drawing die assembled to said base plate on the punch side thereof, said die having a work forming opening therethrough which opening is axially in line with said punch and said central opening, said work forming opening being larger than said punch and being generally of the same cross-sectional shape as said punch in a cross-section through said punch at the level of said projections, indentations in the periphery of said work forming opening being aligned respectively with the said projections; whereby a cup-shaped blank, larger than said work forming opening but of even wall thickness and with the blank's cavity mating said punch out from said projections, when advanced into said die by said punch, is drawn into the desired ridged product with the material following the completed ridges engaging said projections and being held back thereby to afford requisite material to continue the forming of said ridges.

Other objects and advantages of the invention will become more apparent in the course of the following description, particularly when taken in connection with the accompanying drawings.

In the drawings, wherein like numerals are employed to designate like parts throughout the same.

Figure 21:
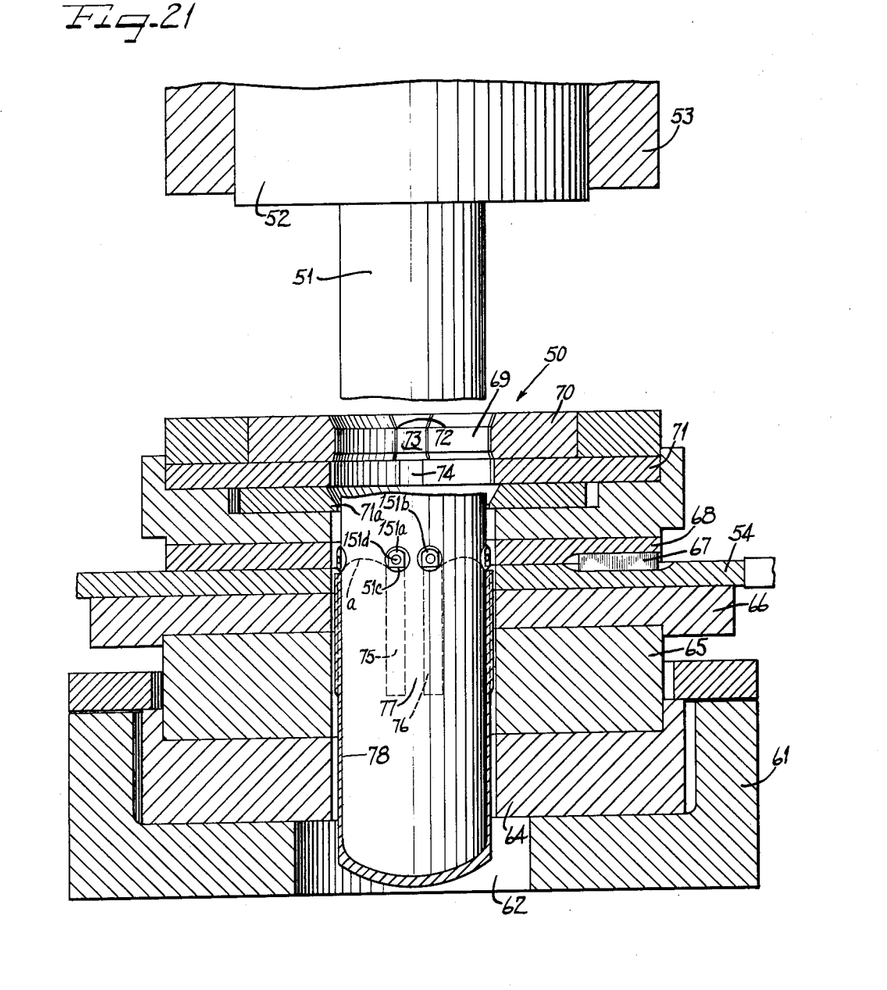
Figure 23:
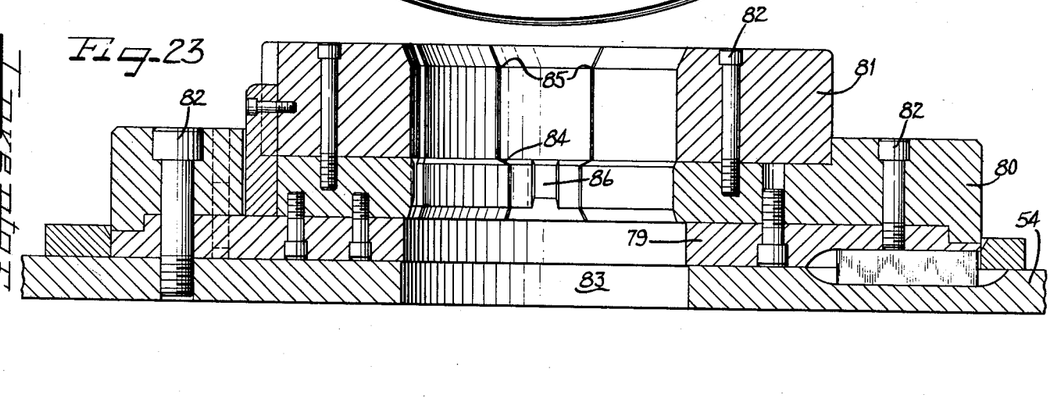
FIGURE 23 is a sectional view of the upper portion of a die section of the type wherein the sixth and succeeding drawing operations may be performed.
Figure 24:
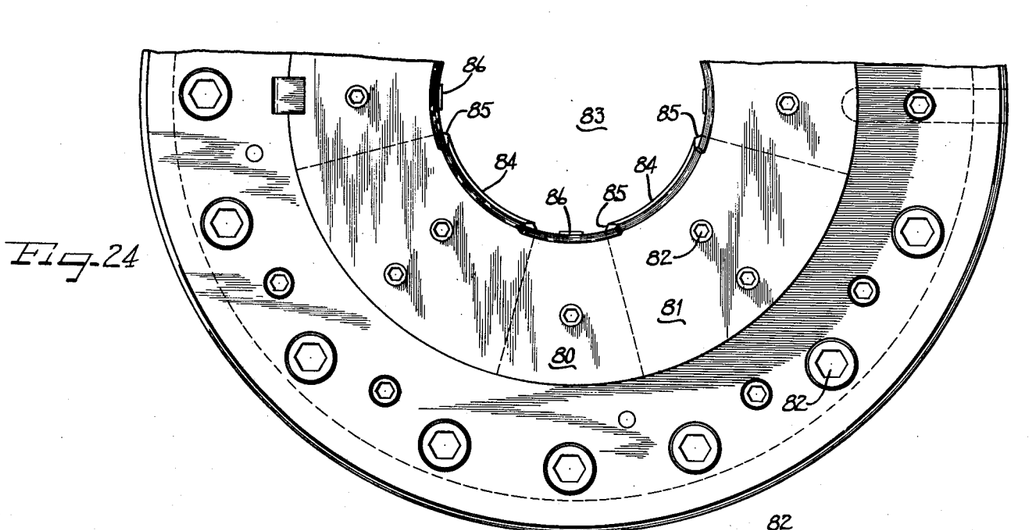
FIGURE 24 is a plan view of the die section of FIGURE 23.

Essentially, the die assembly of FIGURE 21 and that of FIGURES 23 and 24 differ only as to size, since they perform substantially the same function of rib formation.

Figures 1, 2, 3, 4:
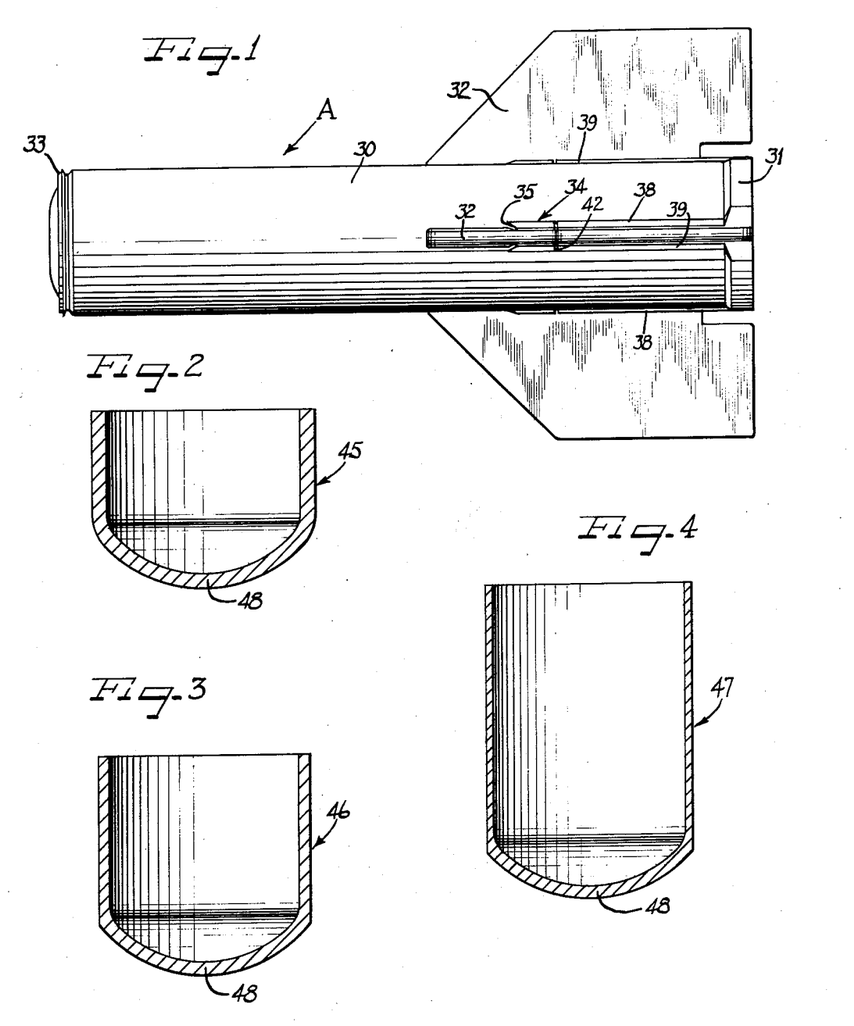
FIGURE 1 is a top plan view of a missile casing assembly with nose and fin portions attached, the casing having been formed in accordance with the principles of this invention.
FIGURE 2 is a sectional view of a cup-shape from which the casing of FIGURE 1 may be formed.
FIGURES 3 and 4 are sectional views to illustrate cup configurations produced by first and second drawing steps performed on the shape of FIGURE 2.

Referring now to FIGURE 1, there is shown for purposes of illustration a motor chamber assembly A comprising a casing 30 of cylindrical configuration having an integral raised collar portion 31 at its aft end and supporting upon its outer diameter a plurality of circumferentially spaced fins 32. A nose portion 33 of suitable shape closes the opposite end of the casing, and for this purpose the cap is provided with the conventional centrally disposed portion (not shown). As will be appreciated, the novel teachings of this invention are applicable to structures other than motor chambers, and may be utilized effectively with any hollow essentially cylindrical shape requiring integral supporting members thereon. Further, while the forming process of this invention is of proven utility with high strength steels, other metals may be similarly processed and good results obtained therefrom.

Figure 12:
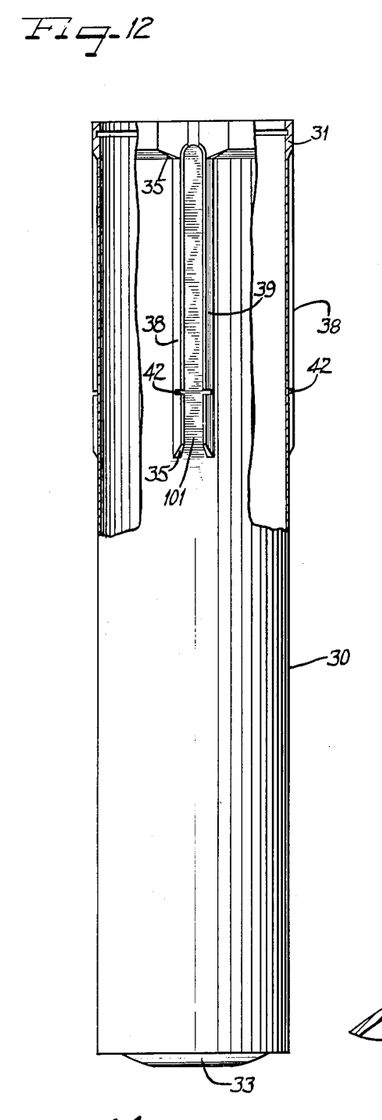
FIGURE 12 is a side elevational view, partly in section, of the missile casing showing the ribs as machined after the sixth drawing step.

Formed by the drawing process of this invention and extending a predetermined distance axially along the chamber or casing circumference is a plurality of rib members 34 receiving each of the fins or control surfaces 32. Referring also to FIGURES 12 and 14, four rib members 34 are circumferentially spaced upon the outer diameter of the illustrative motor chamber 30 shown in the drawings. It will be appreciated, however, that the number and arrangement of the rib members and associated fins may vary, and may extend a greater or lesser distance parallel to the longitudinal axis of the casing. In the structure illustrated, the rib members 34 terminate inwardly of the collar 31 at the aft end of the casing, the latter being provided to reinforce this portion of the casing. A centrally disposed opening 36 is formed in the bottom end wall 37 at the opposite end of the casing (FIGURE 13), and said opening is generally threaded to receive the conventional centrally disposed portion of the nose cap 33.

Each rib member 34 comprises a pair of upwardly and radially inwardly extending rib elements 38 and 39 of predetermined length and thickness, and between each of the rib elements 38 and 39 there is received a shaped base portion 40 on each of the fins 32. The base portion 40 of the fins may be hollow as indicated to reduce the weight thereof, and along the length of the base portion there is preferably provided a pair of outwardly extending wings or arms 41 received in notches 42 in each of the rib elements 38 and 39 to restrain movement of the fins 32. This may be accomplished in any desired manner, and illustratively the wings 41 may be in the form of pins which are driven into the slots after location of the fins. On the other hand, the means 41 may be screws and the slots 42 may be perforations. Forward ends of the rib members may also be beveled as shown at 35 in FIGURE 12.

The fins 32 are formed in any known manner, and may comprise a shaped aluminum alloy sheet 43 containing therewithin a suitable filler material 44. The filler 44 may be one of the foamed plastics, and if desired may be reinforced with glass fibers or the like. The base portion 40 of the fins 32 is preferably of aluminum alloy.

With regard now to the casing forming process, it is preferred to first press into pancake shape a cleaned and heated slug cut from ingot or forged round and, by known punch and die techniques, extrude the pancake shape into a cup configuration 45 of the character shown in FIGURE 2. The shape 45 as thus obtained is possessed of a longitudinal or side wall thickness uniform throughout, and is then subjected to conventional drawing operations wherein the side wall thickness thereof is progressively reduced. The shapes 46 and 47 resulting from additional drawing operations are illustrated in FIGURES 3 and 4, respectively, and it is to be noted in connection therewith that the bottom end wall 48 of each shape 46 and 47 is not substantially reduced in thickness; further, the bottom wall remains of essentially original thickness in the drawing operations to be later described.

By way of specific example, and to illustrate the change in dimensions of the height, side wall thickness and diameter of the cup-shaped workpiece during the first and second drawing steps preliminary to further forming in accordance with the teachings of this invention, particular dimensions will now be given. Assuming the initial shape 45 of FIGURE 2 to have an overall height of approximately 10.9 inches, an inner diameter of 12.0 inches and a side wall thickness of 0.75 inch, the respective dimensions of shape 46 after completion of the first drawing step will be found to be about 13.5 inches, 11.8 inches and 0.62 inch. A second conventional drawing operation is performed to the extent that the shape 47 of FIGURE 4 will preferably have an overall height of approximately 19.1 inches, an inner diameter of 11.7 inches and a side wall thickness of approximately 0.43 inch. As stated, the thickness of the bottom end wall 48 remains essentially uniform through the first and subsequent drawing operations, and as an example, is in the nature of approximately 0.813 inch.

Figure 5:
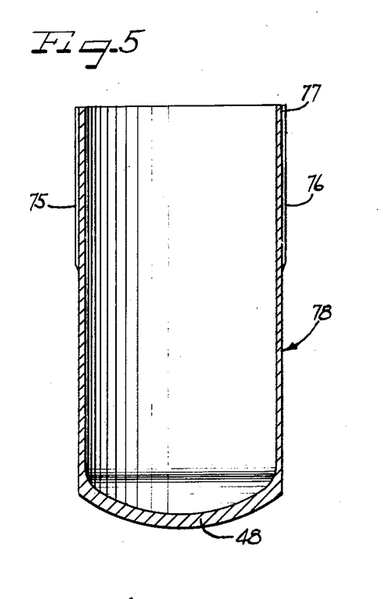
FIGURE 5 is a sectional view of the shape having the preliminary rib formation thereon after being drawn in accordance with the third and fourth drawing steps of this invention.

Proceeding now in accordance with the teachings of this invention, the cup shape 47 of FIGURE 4 is then subjected to a two-step drawing operation to first elongate the lower portion of the shape, and then draw first stage ribs along the longitudinal axis of the upper portion of the shape while simultaneously elongating the same (FIG. 5). Various draw die arrangements may be utilized for this purpose, and a general construction which has proven effective in actual practice is illustrated in FIGURES 20, 21 and 22, and reference is now made thereto.

Figure 22:
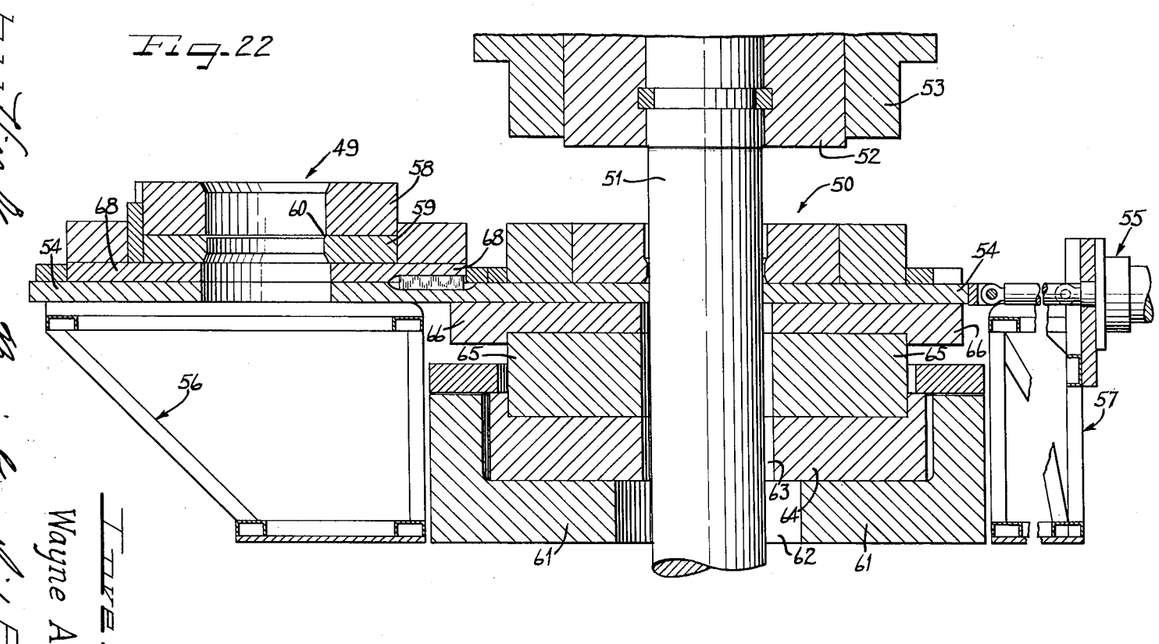

Referring first to FIGURE 22, there is shown more or less schematically a shuttle die construction comprising a pair of die assemblies generally designated by the numerals 49 and 50 arranged to sequentially cooperate with a punch member 51 carried by a head plate 52 supported in a ram 53. The die assemblies 49 and 50 are mounted upon a movable bed plate 54 to which is attached at one end a hydraulic assembly 55 imparting horizontal movement to the bed plate 54 and thereby locating the die assembly 49 or 50 in a punch receiving position when desired. A supporting platform 56 receives one end of the bed plate 54 when the dies 49 and 50 are located as shown, and an additional supporting platform 57 is provided to mount the hydraulic assembly 55 and carry the opposite end of the bed plate 54.

The die assembly 49 functions in cooperation with the punch member 51 to perform the third but partial draw step, namely, to draw the lower portion of the cup shape 47 from FIGURE 4 in order to provide an upper portion of original wall thickness from which the rib structure may be formed. The fourth drawing step is performed in the die assembly 50 (shown only schematically), and in cooperation with the punch member 51, said die assembly 50 functions to draw the upper portion of the shape produced in the die assembly 49 to initially form or cut the rib structure therein.

Figure 20:
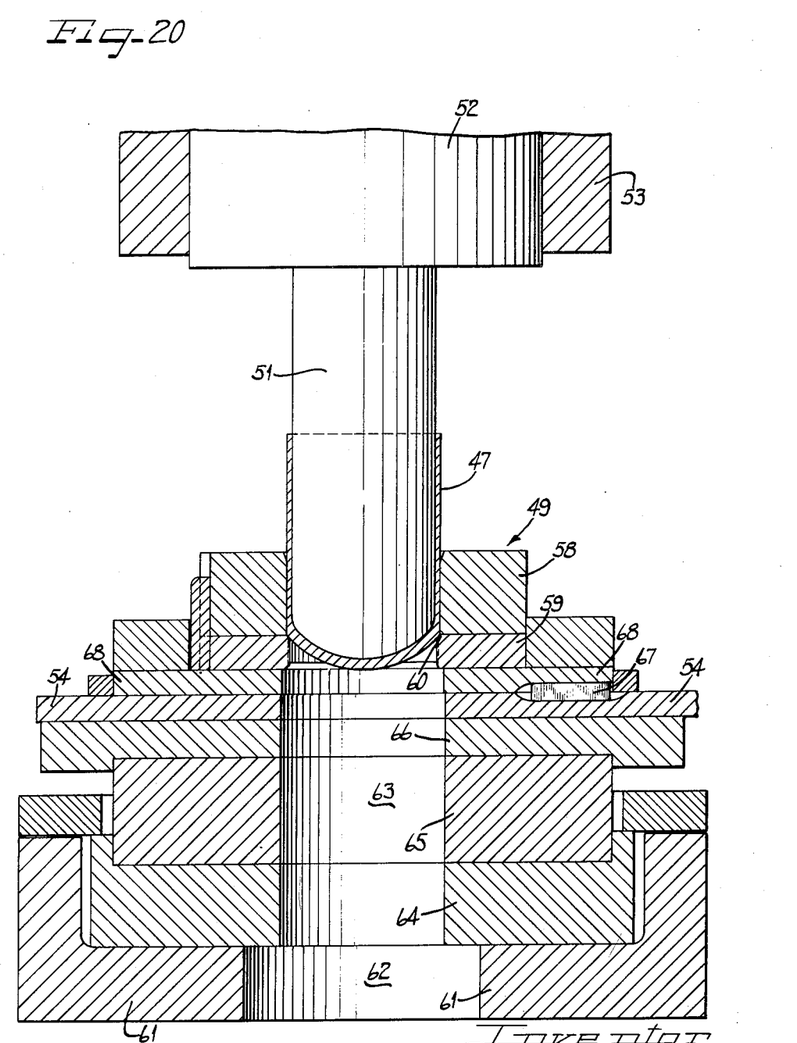
FIGURES 20, 21 and 22 are sectional views of suitable die constructions in which the third and fourth drawing steps may be performed.

The die assembly 49 may comprise essentially the structure shown in FIGURE 20, and therein it may be seen that a pair of female die members 58 and 59 are arranged with respect to one another to provide a ledge or surface 60 against which the cup shape 47 is initially seated prior to performance of the first phase of the third drawing operation. The diameter of the punch 51 is less than the inner diameter of the cup shape 47, and is sized with respect to the drawing cavity in the female die member 59 so that upon downward movement of the punch member 51 the cup shape 47 is elongated or lengthened to provide a side wall thickness therein of predetermined dimensions. It is now apparent that the relative lengths of the cup shape formed by action of the die assembly 49 and punch 51 may be varied as desired by controlling the size of the cavity within the die members 58 and 59 and the length of stroke of the punch member 51.

The die assembly 49 may be constructed in various ways to accomplish the foregoing results, and the entirety may be supported as shown upon a base plate 61 having a central opening 62 therein. The opening 62 communicates with a cavity 63 in the lower portion of the structure that supports the die assembly 49 in its working position, and this cavity is of greater diameter than the outer diameter of the cup shape to receive said shape therein during the third drawing step. The cavity 63 may be defined by a plurality of die block members 64, 65 and 66, the latter block supporting the bed plate 54 suitably pinned as at 67 to an upper die block member 68. Other arrangements and die block structures, of course, can be formed within the skills of those versed in the art.

The action of the die assembly 49 and cooperating punch assembly 51 increases the length of the shape drawn therein and maintains at the upper portion of the shape essentially the original wall thickness as present in the shape of FIGURE 4. The thickness of the bottom wall of the shape produced in the die assembly 49 remains substantially the same, and a minor reduction in inner diameter occurs. In addition, by way of specific example, the length of the shape is increased from about 19.1 inches to 25¼ inches, and the wall thickness in the lower portion of the shape and upwardly of the bottom wall is decreased from approximately 0.43 to 0.28 inch. The original wall thickness in the upper portion of the article shape, wherein the rib members are to be formed, remains essentially the same, because the article is retracted from the female die assembly 49 after the lower portion of the article has been drawn as described above.

To perform the fourth drawing operation, and after removal of the punch 51 from the die cavity, the die assembly 49 is returned by movement of the bed plate 54 to essentially the position shown in FIGURE 22, and the die assembly 50 located in punch receiving relation. The die assembly 50 is shown in detail in FIGURE 21, and reference is now made thereto. The foundation structure of the die assembly 50 is essentially the same as that employed in die assembly 49, and like numerals from FIGURE 20 have been employed to designate corresponding parts in FIGURE 21.

Substantial experience in the drawing of tubular casings of the character herein disclosed has demonstrated that a marked improvement in the article produced is obtained by providing a localized hold-back of the metal mass from which the ribs are formed. One manner of accomplishing this is by utilization in the fourth drawing operation of a punch configuration of the character shown in FIGURE 21. It is to be noted therefrom that the outer diameter of the punch member 151 is provided with a plurality of pairs of circumferentially spaced buttons or inserts 151a and 151b located at a predetermined distance from opposite ends of the punch. The buttons may be secured in any suitable manner to the punch, and preferably are slightly embedded in recesses 151c in the punch outer diameter and mounted rigidly therein by fastening means 151d. The buttons are suitably shaped or contoured, and may be generally square as shown with radially outwardly tapering end walls. Of course, the punch member 151 is located in position after removal of the punch 51 in the manner known in the art.

The buttons or inserts 151a and 151b are arranged upon the circumference of the punch 151 to be longitudinally aligned with the metal being moved into a preliminary rib formation by the die structure to be now described. A localized hold-back of metal is provided by said buttons, and thereby the metal forming the preliminary ribs is moved at a rate calculated to retain in this area sufficient metal for rib formation to avoid the possibility that metal required for the ribs will move into the relatively larger areas circumferentially outwardly of the ribs during elongation of said areas.

Defining a central die cavity 69 at the upper end of the die assembly 50 is a pair of superimposed female die members 70 and 71, while below the member 71 a conventional stripping device 71a may be provided. Each die member 70 and 71 is essentially of ring configuration, and provided on the inner diameter of the die 70 at circumferentially spaced locations thereon are a plurality of radially inwardly extending forming surfaces 72. The surfaces 72 function to draw metal upwardly from the relatively thicker upper portion of the cup shape lying circumferentially between said surfaces, to thereby reduce the thickness of said portion along spaced longitudinal bands. Between the adjacent ends of a pair of draw surfaces 72 the original wall thickness of the shape remains by provision of a relatively flat die surface, designated on the die in FIGURE 21 by the numeral 73, and this area defines a circumferential width of the rib structure which is formed on the increased diameter upper portion of the cup shape as said shape is moved downwardly into the die member 70. The areas 73 are diametrally opposed to one another, and four of said areas are spaced on the circumference of the die member 70 generally 90° therebetween.

In order to form an axially extending groove in the metal mass remaining between adjacent ends of the surfaces 72, the lower die member 71 is provided on its inner diameter with circumferentially spaced drawing surfaces 74 spaced generally at 90° locations with respect to one another. It may thus be seen when referring to FIGURE 21 that downward movement of the punch 151, with the cup shape as drawn in die assembly 49 thereon, first draws metal upwardly by action of the surfaces 72 and thereafter metal is flowed in the area 73 between the surfaces 72 by action of the surface 74 on the die 71. Simultaneously with the drawing action described, and during downward movement of the punch member 151 into the cavity 69, the shape is elongated or lengthened to reduce the wall thickness of the shape in the areas acted upon by the surfaces 72 and 74. It may further be seen that by this invention a greater amount of metal is initially provided for the ribs so that said ribs may elongate with other areas, while still having the required metal therein upon completion of later drawing steps. Further, by provision of the novel inserts or buttons 151a and 151b on the punch member 151, a localized hold-back of metal mass forming the ribs is accomplished and the possibility of rib elongation and flow into adjacent areas is eliminated. It may be noted that the buttons or inserts cause formation of a generally scalloped configuration, as indicated at a, along the shape end wall, and this is removed prior to performance of the next drawing step. As will be apparent, for performance of the successive drawing steps, the inserts 151a and 151b are removed, or a different punch provided, sized in outer diameter to the outer diameter of the shape 78 to exert a pushing force against the end wall thereof. A convenient manner of modifying the punch 151 is to secure thereto a collar or sleeve having essentially the same inner and outer diameters as the open end of the shape 78.

Figure 15:
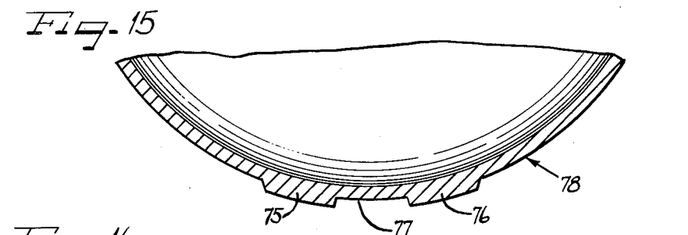
FIGURES 15, 16, 17 and 18 are partial sectional views to illustrate the change in rib shape effected by performance of steps, respectively.

The rib configuration formed upon completion of the fourth drawing operation, namely the foregoing described action of the punch member 151 and die assembly 50, is shown in FIGURE 15. The initially formed ribs are designated at 75 and 76 and are of essentially the same thickness as the side walls of the shape 47 shown in FIGURE 4. The groove or channel between said ribs 75 and 76, identified by the numeral 77, presents the configuration provided therein by the drawing action of the surface 74 on the die member 71. It is to be further noted that while the ribs 75 and 76 are of essentially the original wall thickness, the side wall between and outwardly of said ribs is of relatively lesser thickness. This may be seen also in FIGURE 5 which illustrates more fully the shape 78 as formed in the third and fourth drawing operations. By way of specific example, the side wall thickness between the ribs 75 and 76 may be approximately 0.28 inch and this same thickness exists in the lower portion of said shape 78 downwardly of the ribs 75 and 76. It may additionally be seen in FIGURE 5 that the groove 77 extends entirely along the length of the ribs 75 and 76, and that the ribs terminate inwardly of the open end of the shape 78 to provide the reinforcing collar portion 31 noted previously in connection with FIGURE 12. In particular applications, however, it may be found well to shorten the length of the groove 77 and also to continue the length of the ribs to the end of the shape 78. This may readily be accomplished by minor changes in the fourth drawing operation, as by making a full stroke with the punch 51.

Figure 7:
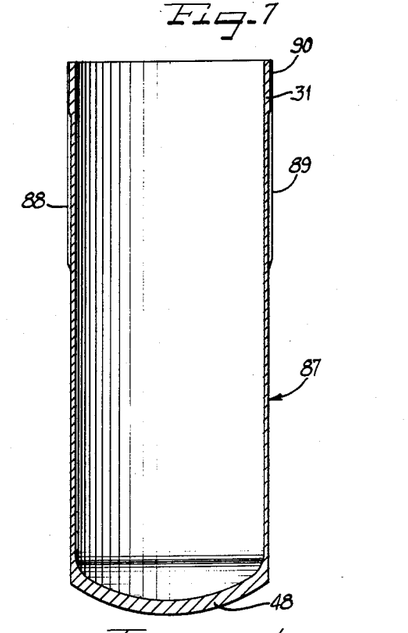
FIGURE 7 is a sectional view of the shape after passing through fifth and sixth partial drawing operations wherein the rib configuration is modified and the shape additionally elongated.
Figure 16:
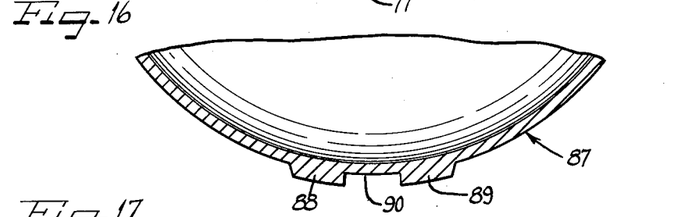

Following the fourth drawing operation, the article 78 is subjected to a fifth draw which is a partial draw similar to the third draw and, similarly, results in elongation of the lower portion of the article, whereafter the article is subjected to a sixth draw wherein the upper ribbed portion of the article is elongated and the ribs 75 and 76 thickened and forged and the collar 31 is also further worked, the resulting shape of the article being seen in FIGURES 7 and 16 wherein it is identified as 87.

A die construction found suitable in actual practice to accomplish the sixth partial drawing operation is illustrated in FIGURES 23 and 24. While the die construction will be described particularly in connection with the sixth draw step, the structural features thereof closely resemble the die members 70 and 71 of the die assembly 50 employed in the fourth drawing operation, as well as the dies utilized in the eighth and tenth partial drawing operations. Suitably secured to the movable bed plate 54 for indexing with respect to the punch member 51 is a die plate member 79 receiving thereupon a draw die member 80 mounting an upper draw die member 81. As is customary in the art, bolts or similar means 82 of various sizes are utilized to secure the foregoing described die sections one to another. A centrally disposed die cavity 83 extends through the die sections 54, 79, 80 and 81 as shown.

Provided on the inner diameter of the die member 81 are drawing surfaces 84, and opposite ends of each of said surfaces 84 are tapered as at 85 to bear against and confine the ribs 75 and 76 from the fourth drawing operation as the shape 78 is moved downwardly into the cavity 83. These surfaces 85, by contact with the ribs 75 and 76, further move the ribs inwardly in a circumferential direction toward one another during the drawing operation. As described in connection with the fourth drawing operation, the surfaces 84 resembling the surfaces 72 of the die member 70 move the metal upwardly during a simultaneous elongation of the shape 78 to reduce the wall thickness of said shape circumferentially outwardly of the ribs.

The die member 80 is provided on its inner diameter at opposed locations with drawing surfaces 86 which act upon the metal of the shape 78 between the ribs 75 and 76 thereon to reduce the wall thickness by upward metal movement. By action of the surfaces 84, 85 and 86, in association with the downward movement of the punch member 51 which continuously elongates the shape 78, the wall thickness of the shape 78 in all portions of the upper region of said shape is progressively reduced, while the metal forming the ribs remains essentially of the same thickness as the initial shape received from the second drawing step noted in connection with FIGURE 4. The resulting shape 87 is not sent all the way through the sixth draw die assembly, but is arrested allowing material to thicken and forge between the remainder of the ridged portion and which forging forms the raised external collar 31 near the open end of the article, the article then bring retracted from the sixth draw female die.

The shape 87 after being acted upon in the die construction of FIGURES 23 and 24 is illustrated in FIGURE 7. The bottom wall thereof is of generally the same thickness as the shape 47 of FIGURE 4 and the shape 78 of FIGURE 5. The length of the shape 87, however, has been increased from essentially 25¼ inches in the shape 78 of FIGURE 5 to about 33¼ inches, and the side wall thickness downwardly of the ribs reduced from approximately 0.28 inch to 0.197 inch. A minor reduction in inner diameter has also occurred.

Figure 6:
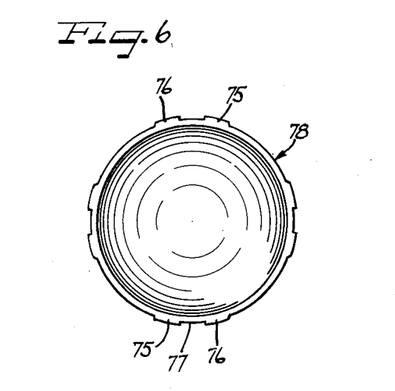
FIGURE 6 is an end view of the shape of FIGURE 5.
Figure 8:
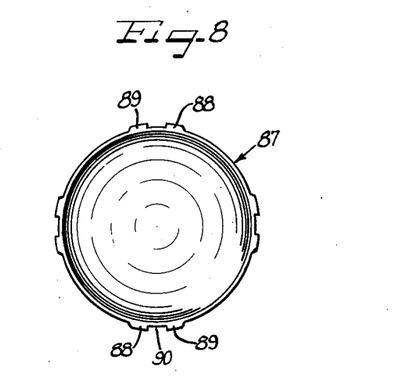
FIGURE 8 is an end view of the shape of FIGURE 7, and showing the relatively closer spacing of the individual ribs of each pair as formed by the additional draw.

Referring now also to FIGURES 6 and 8, which are end views of the shapes 78 and 87 of FIGURES 5 and 7, respectively, it is to be pointed out that the circumferential span of the ribs 75 and 76 of shape 78 has decreased from approximately 4.24 inches to 3.16 inches. The configuration of ribs 88 and 89 of the shape 87 are shown in FIGURE 16, and it may be noted that a movement of metal has occurred bringing the end walls of said ribs circumferentially inwardly. The groove 90 between said ribs is also of relatively lesser span than the groove 77 of the shape 78 appearing in FIGURE 15. The reduction in side wall thickness of the shape 87 as compared with the shape 78 also clearly appears in FIGURE 16.

Figure 17:
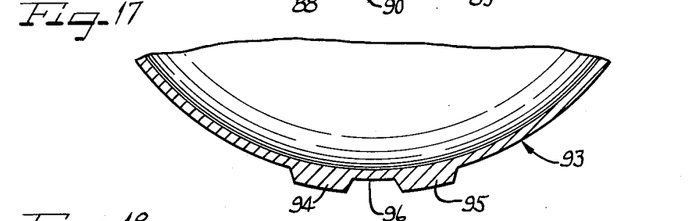
Figure 18:
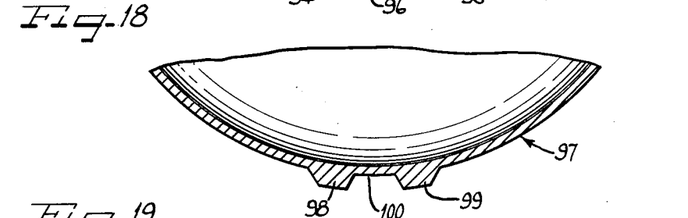

As noted earlier, the die constructions employed in the eighth and tenth partial drawing operations, which modify the rib configuration and reduce the wall thickness to the configurations shown in FIGURES 17 and 18 respectively, may embody the features of the arrangement shown in FIGURES 23 and 24 and utilized in the sixth partial draw operation. Essentially, however, the drawing surfaces which act upon the shape circumferentially outwardly of the rib area are spaced diameterally relatively more closely toward one another to effect a wall thickness reduction. In addition, the drawing surfaces acting between the ribs on the body wall are also of relatively lesser distance therebetween from a diameteral standpoint. Surfaces corresponding to the surfaces 85 in FIGURE 24 are further employed to bear against the end walls of each of the ribs to move the metal in said ribs in a circumferential inward direction. The dies of FIGURES 23 and 24 may be positioned in a shuttle die arrangement as shown in FIGURE 22, and by way of example, the dies of FIGURES 23 and 24 may be in the position of the die assembly 50 and a set of dies to be used in the fifth partial elongation drawing operation upon the lower portion of the article and located in the position of the die assembly 49. The die constructions for the eighth and generally final tenth operation may be located with respect to respective companion elongation and partial drawing dies for the lower portion of the article and constituting the seventh and ninth drawing dies of the series of dies.

It should be pointed out that only in the third drawing operation does the entire length of the shape travel completely downwardly past the drawing surfaces and during which a full draw is effected thereon. Stated otherwise, the action in the third drawing operation is to partially elongate the shape to reduce the wall thickness of the lower portion, followed by the fourth drawing operation in which the ribs 75 and 76 are formed thereon simultaneously with a further draw to additionally elongate the shape. The shape 78, however, progresses completely downwardly into the cavity 63 of the die assembly 49. In the sixth, eighth and tenth partial drawing operations, on the other hand, only the raised rib portion of the shape is acted upon by the draw die, and accordingly, these drawing steps of applicant's method are partial rather than full draws.

Figure 9:
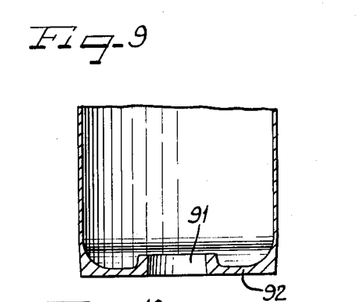
FIGURE 9 is a sectional view of one end of the shape to illustrate the pre-heading step performed thereon.

Preferably between the sixth and eighth drawing steps the closed bottom end wall of the cup shape 87 is preheaded to essentially the configuration shown in FIGURE 9. Provided by this step, which is performed in a conventional manner, is an apertured embossment 91 and an essentially flat bottom end wall 92. Substantially right angle corners are also formed at this end of the shape, and the apertured embossment 91, when finally formed and threaded, receives the cap portion 33 of the casing 30.

Figure 10:
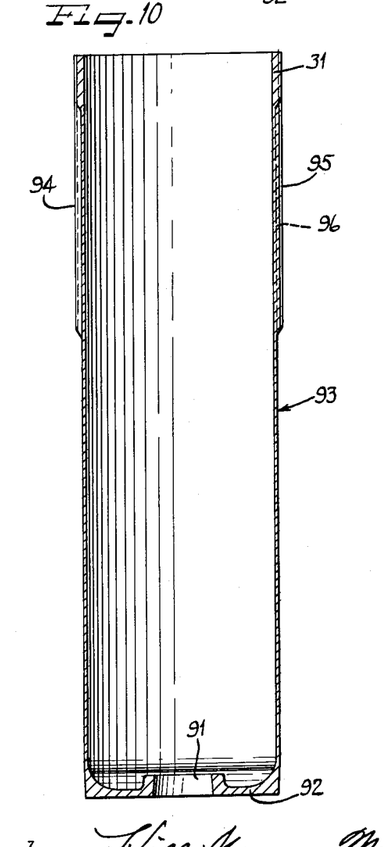
FIGURE 10 is a sectional view of the shape as received from seventh and eighth partial drawing steps in which the rib configuration is further modified and the length of the entire shape increased.
Figure 11:
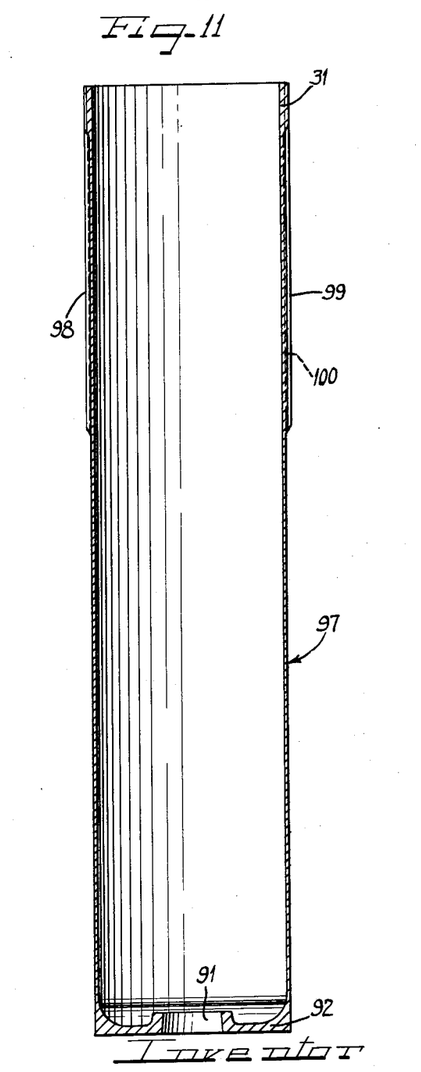
FIGURE 11 is a sectional view of the shape as produced in eighth and tenth partial drawing steps to illustrate further formation of the ribs to the configuration desired.

The shapes produced by the eighth and tenth partial drawing operations are shown in FIGURES 10 and 11, respectively. The effect of the eighth draw is to additionally elongate the entire shape 87 of the sixth draw step, and further move the metal of the ribs on the shape 93 to the configurations of FIGURE 17. The ribs 88 and 89 as shown in FIGURE 16, representing the results of the sixth drawing step, are also elongated, and by way of specific example, may be lengthened from essentially 9.28 inches to 13.64 inches. The shape of the ribs 94 and 95 as formed in the eighth drawing step are indicated in FIGURE 17, and it may be noted said ribs have been moved relatively more closely toward one another whereby a groove 96 therebetween is of relatively lesser width than the groove 90 of the sixth step in FIGURE 16. The cross-sectional thickness of the ribs 94 and 95 remains essentially the same as the ribs of the earlier step. With regard to the overall length of the shape 93 of FIGURE 10 and 97 of FIGURE 11, the shape 93 as produced from the eighth partial draw step may typically have a length of approximately 44¼ inches, while the overall length of the shape 97 formed in the tenth partial draw step may be approximately 56 inches. The wall thickness downwardly of the ribs in FIGURE 10, by way of illustration, may be approximately 0.138 inch and the wall thickness in the same general region of the shape 97 may be reduced to approximately 0.106 inch. These latter dimensions would, of course, be essentially the same in the circumferential area between the ribs of both shapes 93 and 97. Adjacent the open end of each of the shapes, in the section forming the collar 31, the wall thickness remains essentially constant through all partial drawing steps, and has been found to be approximately 0.44 inch. These dimensions are, of course, illustrative only and the described steps may be suitably modified to vary the dimensions, and thereby obtain shapes particularly adapted for a required set of conditions.

Viewing now FIGURE 18, which shows the rib formation and wall thickness reduction accomplished in the tenth drawing step, it may be noted that the ribs 98 and 99 of shape 97 are spaced one from the other at their bases by a groove 100 having a width approximately the same as the width of the groove 96 on the shape 93 of the eighth drawing step illustrated in FIGURE 17. However, metal movement in an upward direction circumferentially outwardly of the ribs 98 and 99 has occurred to maintain an essentially constant cross-sectional thickness in said ribs.

Figure 19:
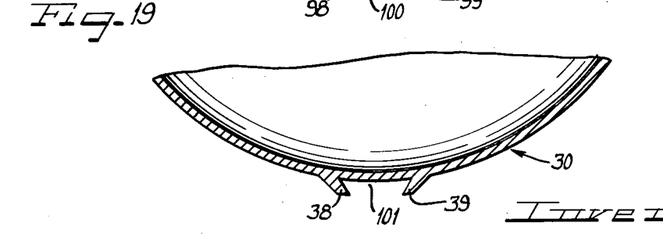
FIGURE 19 is a sectional view illustrating the rib configuration obtained after machining to the final configuration desired.

The final configuration of the ribs on a motor chamber 30 was described earlier in connection with FIGURE 14 and related figures, and is further shown in cross section in FIGURE 19. To obtain the rib shape shown therein from the ribs 98 and 99 of FIGURE 18, a machining operation has been found desirable. This is done by grinding the inner corners of the ribs 98 and 99 radially inwardly at an angle which additionally increases the width of the groove 100 from FIGURE 18 to essentially the form shown in FIGURE 19. By the machining operation, the ribs 38 and 39 extend upwardly and inwardly toward one another in a generally oblique manner, and a groove 101 is obtained therebetween to receive the base section 40 of the fin 32 as shown in FIGURES 1 and 14.

Figure 13:
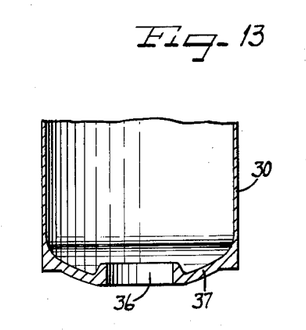
FIGURE 13 is a sectional view of one end of the casing illustrating the configuration thereof after a heading and machining operation has been performed thereon.
Figure 14:
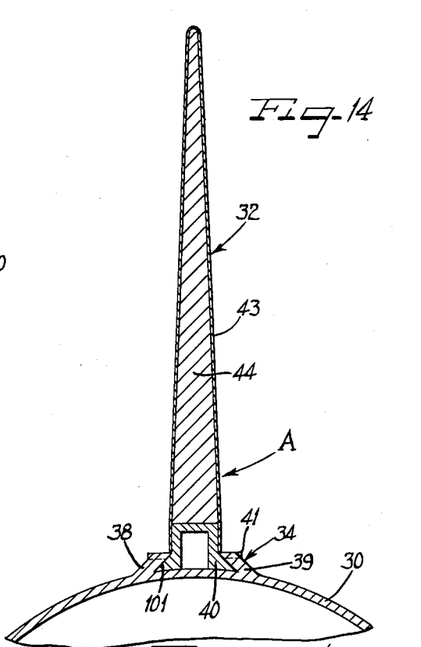
FIGURE 14 is a sectional view of the fin or control surface as supported in the rib construction formed in accordance with the teachings of this invention.

A final heading operation is thereupon performed, and the end wall configuration obtained by the latter step is shown in FIGURE 13. The opening 36 is finally finished and threaded to receive the cap portion 33. As formed by the final heading step, the end wall 37 presents a slight convexity in the central portion, while the corners of the end portion remain essentially at right angles.

Figure 25:
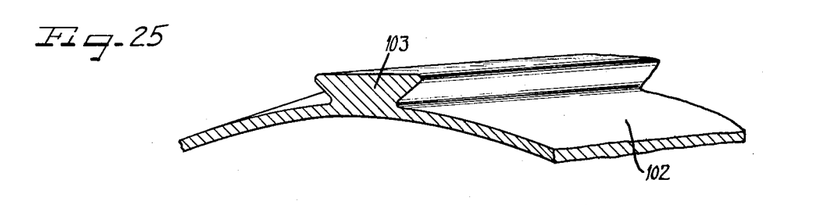
FIGURES 25 to 34 are sectional views of alternate rib configurations which may be produced in accordance with the teachings of this invention.
Figure 26:
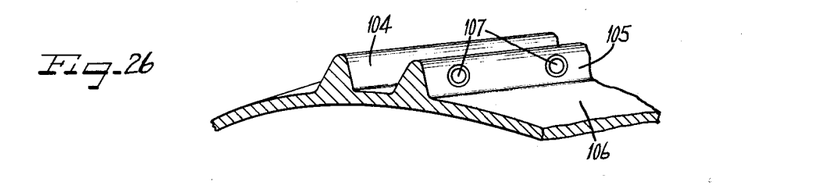

Alternate or different rib configuration may readily be provided by suitable modifications to the die structures disclosed. Referring now to FIGURES 25 through 34, there is shown exemplary alternate rib shapes, although it will be appreciated many other configurations may be produced. In FIGURE 25, a casing 102 has integral therewith an inverted generally triangularly shaped rib 103, while in FIGURE 26 a pair of spaced triangle shaped ribs 104 and 105 are part of the metal mass forming a casing 106. Openings 107 may be provided in this form or other forms to receive attaching screws or the like for the fin structure 32.

Figure 27:
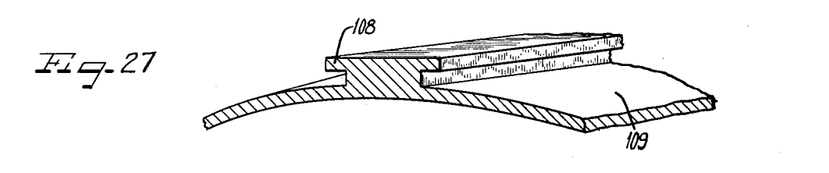
Figure 28:
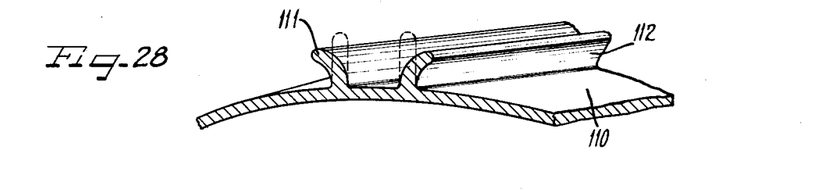
Figure 29:
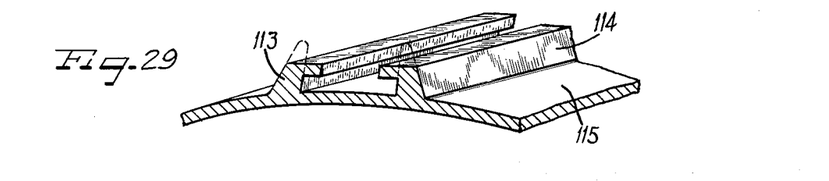

FIGURE 27 illustrates a generally T-shaped rib 108 upstanding from a casing 109, while in FIGURE 28 there is shown a casing 110 carrying a pair of relatively slender ribs 111 and 112, said ribs being indicated in phantom lines as initially formed and in full line after being curved circumferentially outwardly. A casing or other tubular shape 115 may have provided thereon ribs 113 and 114 of the configuration of FIGURE 29, the ribs being shaped inwardly toward one another after extending radially outwardly with respect to the casing in their main body portions. The shape of said ribs initially is shown in broken lines.

Figure 30:
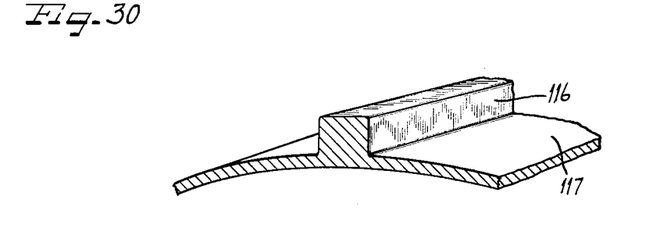
Figure 31:
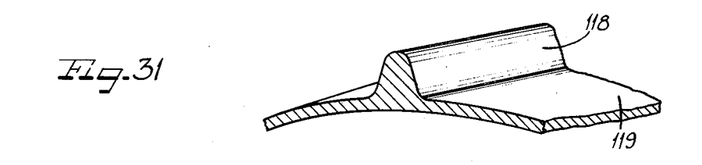
Figure 32:
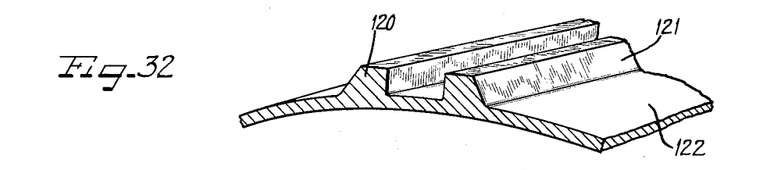
Figure 33:
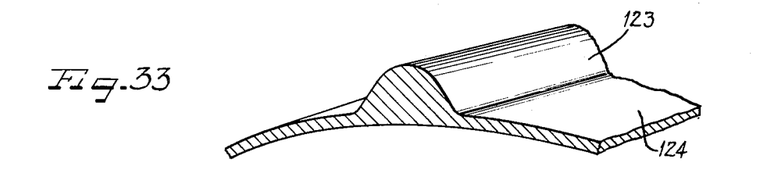
Figure 34:
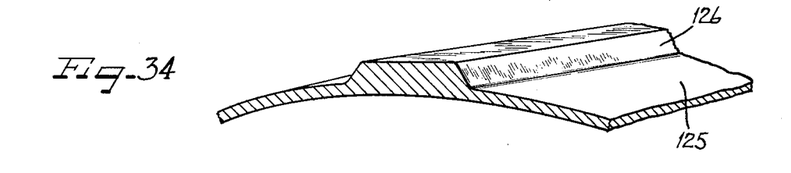

A generally rectangular rib 116 may be provided on a casing 117, as shown in FIGURE 30, and a smoothly rounded generally triangle rib 118 used in connection with a casing 119, as appears in FIGURE 31. Spaced ribs 120 and 121, as in FIGURE 32, of generally trapezoidal configuration also find application when integrally formed with a supporting casing 122. Further, a smoothly rounded rib 123 of the character shown in FIGURE 33 may be drawn with a casing 124, and in FIGURE 34 is illustrated a casing 125 integrally carrying a rib 126 having tapered sides and a generally flat top wall. The variations in rib shape which may be made without departing from the spirit of this invention are accordingly considerable. Further, other fin configurations than that shown in FIGURE 14 can of course be employed, and the specific shape forms no part of the present invention.

Experience obtained in production of the articles herein disclosed has demonstrated that extreme accuracy of fin alignment is assured when the supporting ribs are formed as an integral part of the casing. Further, the guidance of the airborne vehicle is simplified since corrections for fin misalignment are no longer required. It is of extreme importance, for maximum efficiency of the missile, that the motor chamber be a thin wall, light weight article of high physical properties capable of containing maximum propellant and imparting to the vehicle greater thrust and range. As produced in accordance with the method of this invention, the casing has more uniform physical properties in both the longitudinal and transverse planes than is obtainable with the prior welding technique. Further, problems associated with welding a high alloy content casing required by the earlier technique are eliminated.

It may be seen from the foregoing that applicant has provided a novel method of forming tubular shapes with integral ribs thereon which is well adapted to production operations and assures consistently uniform and high quality results. Concentricity is at all times maintained between the inner and outer diameters of the shapes being produced in each of the successive steps of the operation described, and high strength characteristics exist in all portions of the structure produced. Since there are no seams in the article provided in accordance with the teachings of this invention, ruptures and other physical breakdowns often associated with prior art methods are essentially entirely avoided.

It is to be understood that various modifications may be effected in the procedures and structures herein disclosed without departing from the spirit of the invention or the scope of the subjoined claims.

I claim as my invention:

1. A method of forming a tubular product for subsequent use as the casing of a rocket motor chamber comprising the steps of:
   (1) indirectly extending a cup-shaped article of substantially constant longitudinal side wall thickness;
   (2) subjecting said article to a first draw which elongates and thins the side wall;
   (3) subjecting said article to a second draw similar to said first draw and with similar results;
   (4) subjecting said article to a third draw wherein a portion of said wall for a distance above its bottom is elongated and thinned leaving the remaining portion of said wall of the thickness formed in said second draw;
   (5) retracting said article back out of the third draw female die without affecting the thickness of said remaining portion;
   (6) subjecting said article to a fourth draw wherein said portion of said wall above said bottom goes loosely through the female die being unworked thereby but wherein said remaining portion is formed with a plurality of pairs of longitudinally extending external ridges and is thinned to the thickness of said remaining portion between said ridges;
   (7) subjecting said article to a fifth draw which is a partial draw similar to said third draw and with similar results;
   (8) retracting said article back out of the fifth draw female die without affecting the thickness of said remaining portion;
   (9) subjecting said article to a sixth draw which is a partial draw similar to said fourth draw but differing therefrom in that said article is not sent all of the way through the sixth draw female die but rather is arrested allowing material to thicken and forge between the remainder of the ridged portion which forging forms a raised external collar near the open end of said article;
   (10) subjecting said article to a preheading operation which flattens said bottom, forms an aperture therethrough, and forms an embossment around said aperture;
   (11) repeating pairs of subsequent draws similar to said fifth draw and said sixth draw;
   (12) annealing between said subsequent draws as necessary and thus producing the desired finally drawn form of said article;
   (13) and subjecting said article to a final heading operation, thus producing the desired final head shape on said article.

2. A method as in claim 1 and further comprising the steps of:
   (14) finishing and internally threading said aperture;
   (15) finishing each pair of said ridges and undercutting the facing sides thereof whereby a mating groove is formed between said each pair to accommodate the tongue of a respective rocket fin when the same is ultimately assembled;
   (16) and transversely notching said each pair of said ridges to accommodate a locking projection to lock said fin in place with respect to said grooves.

3. A punch and die assembly for producing external ridges spaced around the periphery of a cup-shaped article comprising:
   (1) a stationary base plate having a central opening therethrough;
   (2) a cylindrical power driven punch reciprocal into and back out of said base plate, said punch having a plurality of button-shaped projections arranged at selected positions around the periphery of said punch with the lower edges of said projections occupying a plane that is normal to the punch axis;
   (3) and a female drawing die assembled to said base plate on the punch side thereof, said die having a work forming opening therethrough which opening is axially in line with said punch and said central opening, said work forming opening being larger than said punch and being generally of the same cross-sectional shape as said punch in a cross-section through said punch at the level of said projections, indentations in the periphery of said work forming opening being aligned respectively with the said projections;

whereby a cup-shaped blank, larger than said work forming opening but of even wall thickness and with the blank's cavity mating said punch out from said projections, when advanced into said die by said punch, is drawn into the desired ridged product with the material following the completed ridges engaging said projections and being held back thereby to afford requisite material to continue the forming of said ridges.

References Cited in the file of this patent

UNITED STATES PATENTS

| | | |
|---|---|---|
| 387,472 | Weeden | Aug. 7, 1888 |
| 721,214 | Mannesmann | Feb. 24, 1903 |
| 1,082,199 | Knaebel | Dec. 23, 1913 |
| 1,826,813 | Oberschulte | Oct. 13, 1931 |
| 1,925,823 | Singer | Sept. 5, 1933 |
| 2,024,185 | Rober | Dec. 17, 1935 |
| 2,133,467 | Purtell | Oct. 18, 1938 |
| 2,371,716 | Snell | Mar. 20, 1945 |
| 2,559,679 | See | July 10, 1951 |
| 2,668,345 | Eckstein | Feb. 9, 1954 |
| 2,748,932 | Kaul | June 5, 1956 |